United States Patent [19]

Gaunt et al.

[11] 4,450,721

[45] May 29, 1984

[54] APPARATUS FOR INDICATING QUANTITY OF LIQUIFIED GAS CONTAINED IN A STORAGE CONTAINER

[75] Inventors: John Gaunt; Kenneth E. Gregory, both of Nottingham, England

[73] Assignee: Energy Innovation Enterprises, Ltd., Channel Islands

[21] Appl. No.: 333,874

[22] PCT Filed: Apr. 16, 1981

[86] PCT No.: PCT/GB81/00072

§ 371 Date: Dec. 17, 1981

§ 102(e) Date: Dec. 17, 1981

[87] PCT Pub. No.: WO81/03067

PCT Pub. Date: Oct. 29, 1981

[30] Foreign Application Priority Data

Apr. 17, 1980 [GB] United Kingdom ............... 8012608

[51] Int. Cl.³ .................. G01F 23/18; G01F 23/14
[52] U.S. Cl. .................. 73/290 B; 116/292; 73/708; 73/290 R
[58] Field of Search ........... 73/149, 290 R, 290 B, 73/708; 116/292

[56] References Cited

U.S. PATENT DOCUMENTS

| 1,856,079 | 5/1932 | Mott | 73/149 |
| 3,301,062 | 1/1967 | Reesby et al. | 73/708 X |
| 3,596,510 | 8/1971 | Siegel et al. | 73/149 |
| 3,602,046 | 8/1971 | Lawford | 73/149 X |

FOREIGN PATENT DOCUMENTS

| 722374 | 10/1968 | Belgium | 73/149 |
| 684114 | 11/1939 | Fed. Rep. of Germany | 73/290 R |
| 850958 | 7/1952 | Fed. Rep. of Germany | 73/149 |
| 1804061 | 6/1970 | Fed. Rep. of Germany | 73/313 |
| 466487 | 5/1914 | France | 73/149 |
| 824886 | 2/1938 | France | 73/149 |
| 828472 | 5/1938 | France | 73/299 |
| 1598995 | 8/1970 | France | 73/149 |
| WO81/03067 | 10/1981 | PCT Int'l Appl. | 73/149 |
| 192943 | 3/1922 | United Kingdom | 116/292 |
| 484764 | 5/1938 | United Kingdom | 73/149 |

Primary Examiner—Gerald Goldberg
Assistant Examiner—Tom Noland
Attorney, Agent, or Firm—Poms, Smith, Lande & Rose

[57] ABSTRACT

Apparatus for indicating quantity of liquified gas contained in a storage container for supplying gas to a consuming appliance, the apparatus including a pressure sensor for sensing gas pressure within the container and being arranged to operate an indicator which gives a desired indication, the indicator being calibrated to indicate the quantity by weight or volume of liquified gas contained in the container.

10 Claims, 5 Drawing Figures

APPARATUS FOR INDICATING QUANTITY OF LIQUIFIED GAS CONTAINED IN A STORAGE CONTAINER

BACKGROUND OF THE INVENTION

The present invention relates to apparatus for indicating quantity of liquified gas contained in a storage container for supplying gas to a consuming appliance.

The invention is primarily concerned with an apparatus which indicates the quantity by weight or volume of liquified butane of propane remaining in a container.

Since containers for liquified butane or propane are normally made of metal, they are non-transparent and therefore it is not possible to see how much liquified gas is present in the container.

Heretofore, the most common determination of the quantity of liquified gas in such a container has been achieved by weighing the container and substracting from that reading the weight of the empty container. This method is inconvenient since it requires the operative to know the weight of the empty container prior to it being emptied and also requires the operative to lift the container in order to weight it. This can be very difficult particularly bearing in mind that a full container can be very heavy for a person to lift.

There is therefore a need to provide an apparatus which can indicate in a convenient manner, the quantity by weight or volume of liquified gas in the container without the need to actually weigh the container.

SUMMARY OF THE INVENTION

According to one aspect of the present invention there is provided apparatus, for indicating quantity of liquified gas contained in a storage container for supplying gas to a consuming appliance, the apparatus including a pressure sensing means for sensing gas pressure within the container and being arranged to operate an indicator means which gives a desired indication, the indicator means being calibrated to indicate the quantity by weight or volume of liquified gas contained in said container.

According to another aspect of the present invention there is provided a method of determining the quantity, by a weight or volume, of a liquified gas in a container comprising the steps of determining the gas pressure within the container during use, and using the determined gas pressure to indicate the quantity of liquified gas in the container.

BRIEF DESCRIPTION OF THE DRAWINGS

Reference is now made to the accompanying drawings, in which.

DETAILED DESCRIPTION

Figure 1:
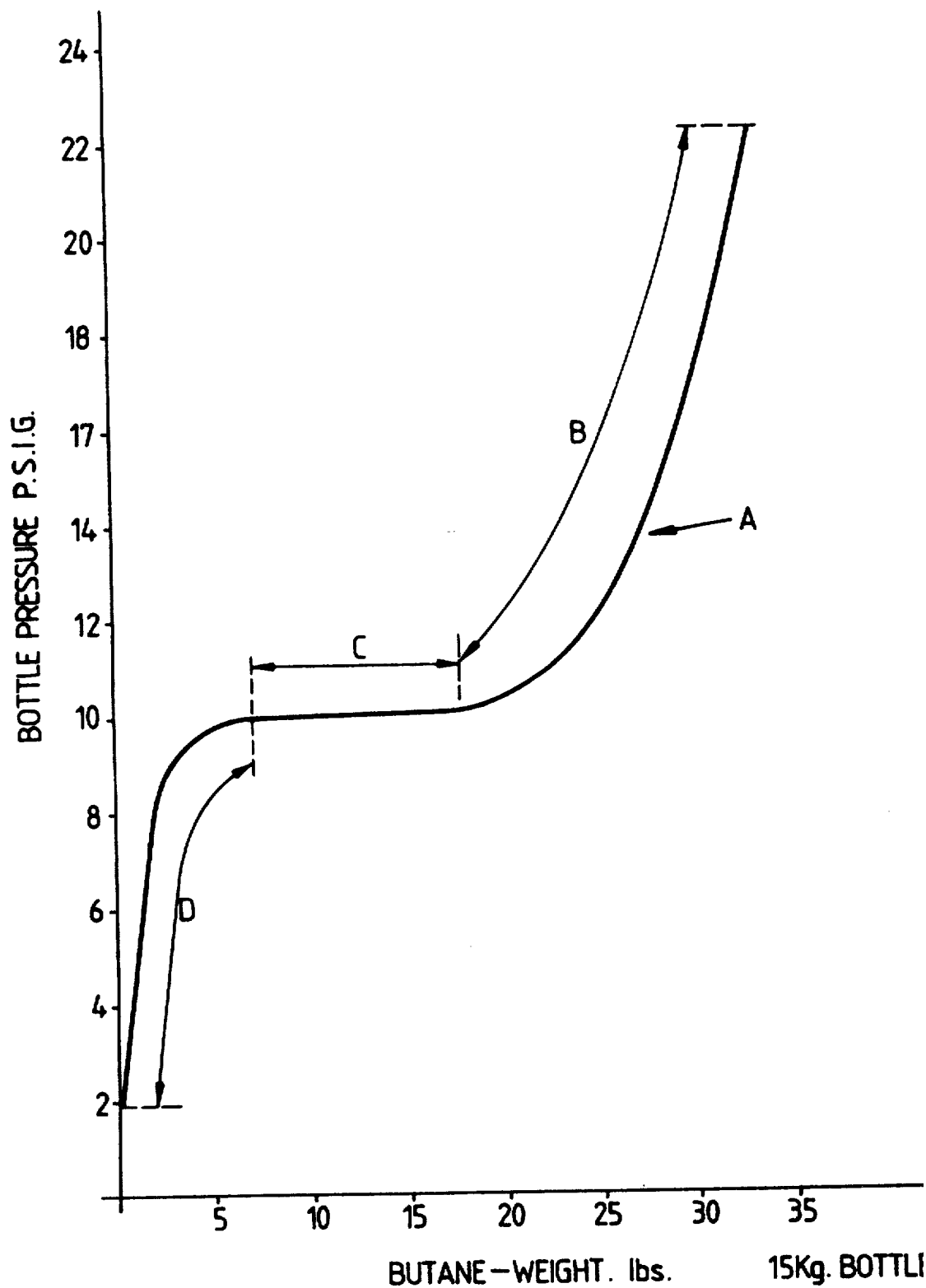
FIG. 1 is a graph showing the relationship between gas pressure and weight of liquified gas within a container during controlled release of gas from the container.

Referring initially to FIG. 1 the vertical axis of the graph indicates gas pressure within the container in units of pounds per square inch (p.s.i.) and the horizontal axis indicates the weight in pounds of the liquified gas in the container. When no gas is being released from the container, the pressure of the gas remains at a constant pressure at a constant ambient temperature. This is referred to as a static system. Thus measurement of pressure in a static system gives no indication of the quantity of liquified gas in the container since the pressure will remain unchanged (ignoring temperature effects) whilst there is liquified gas present.

However, it has been surprisingly discovered that when gas is released from the container in a controlled manner (for instance as when the pressurised gas is supplied to the consuming appliance via a presssure regulator) then there is a pressure variation within the container. This is referred to as a dynamic system.

The graph of FIG. 1 relates to a dynamic system and is a plot of pressure drop during usage. It has been found that the shape of the curve A is the same for any liquified gas/vapour system contained within a constant volume and in which the vapour or gas is released in a controlled manner.

Accordingly it has been discovered that by calibrating indicator means which are responsive to a pressure sensing means it is possible to indicate the weight or volume of liquified gas contained within a container whilst gas is being released.

It has also been discovered that once the release of gas is stopped, then as expected the gas pressure rises to that of the vapour pressure of the liquid. However once the gas is released again, the pressure rapidly falls to the value indicated by the plot of FIG. 1. Thus the relationship between weight of liquified gas and gas pressure in the dynamic system holds good even with intermittent release of gas.

As indicated in FIG. 1, the plot A has three distinct regions; viz. a first region B, a plateau zone or second region C, and a third region D. The third region D indicates a rapid drop in pressure with weight of liquified gas and when calibrating the indicator means, it is this region which is particularly useful. The accuracy in region D is high due to the large change in pressure in relation to a small change in weight and additionally since it has been found that moderate changes in ambient temperature have little or no effect on the pressure/weight relationship in range D.

Figure 2:
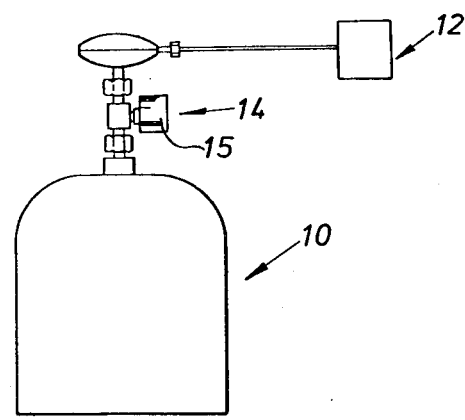
FIG. 2 is a schematic view of a system including an apparatus according to the present invention.

By way of example, FIG. 2 shows a container 10 of liquified gas which supplies gas to an appliance 12. A combined pressure sensing means and indicating means 14 in the form of a gauge 15 is positioned so as to monitor pressure within the container.

Figure 3:
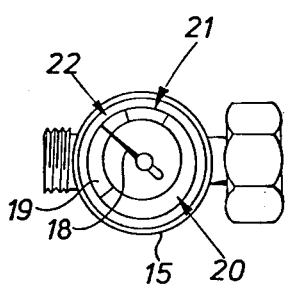
FIG. 3 is a front view of a gauge calibrated in accordance with the present invention.

As shown in FIG. 3 the gauge 15 has a diaphragm (not shown) which operates a pointer 18 which moves over a dial 19 which is calibrated to show the three regions B, C and D as designated by divisions 20, 21 and 22 respectively. Thus by viewing the gauge 15 during use of appliance 12 it is possible to determine what quantity of liquified gas is present in the container.

Figure 3A:
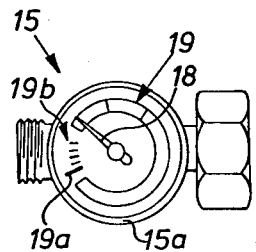
FIG. 3a is a similar view to FIG. 3 showing a modification.

In order to compensate for ambient temperature changes it is envisaged to make the calibrated scale or dial 19 movable relative to the pointer 18. In this respect FIG. 3a shows a modification of the gauge 15 wherein the scale is mounted upon the glass of the gauge and the outer casing 15a holding the glass is rotatably mounted on the remainder of the gauge. A marker 19a on the glass is superimposed over a scale 19b on the face of the dial behind the pointer so as to give a reference of the extent of rotation of the glass (and hence the scale 19) relative to the remainder of the gauge 15. The scale 19b is preferably graduated so as to give ambient temperatures so that marker 19a is aligned with the corresponding ambient temperature graduation before a reading is taken from the gauge.

Figure 4:
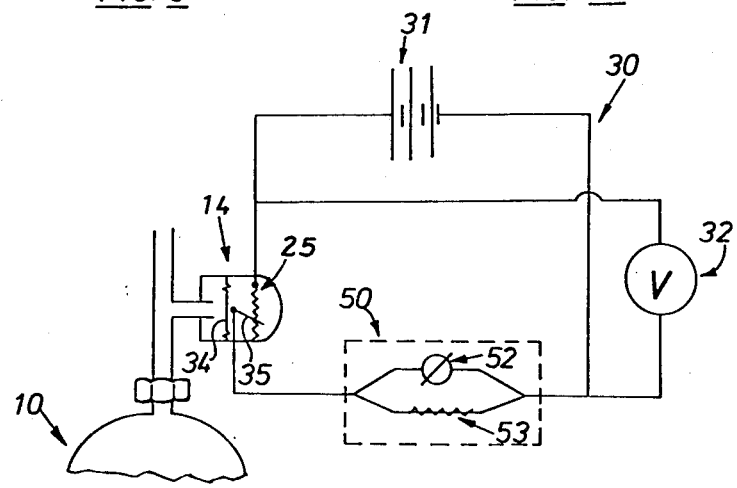
FIG. 4 is a schematic view of a further embodiment according to the present invention.

A further example is illustrated in FIG. 4 wherein the pressure sensing means 14 is in the form of a pressure sensitive rheostat 25. The rheostat 25 forms part of an electrical circuit 30 which also includes a voltage source 31 and an indication means in the form of voltmeter 32. The voltmeter 32 is calibrated to indicates weight or volume of liquid present. Thus, in use, pressure changes in the container operate the diaphragm 34 of the pressure sensing means 20 which in turn moves the wiper contact 35 of the rheostat 25 to change its resistance value. This change in resistance causes the voltmeter to indicate a change in measured voltage.

A modification is also included in the embodiment of FIG. 4 wherein a temperature compensator 50 is included which serves to alter the resistance of circuit 30 in order to compensate the readings on the voltmeter for temperature variations. This is possible since in both the static and dynamic systems the vapour pressure varies in direct proportion to temperature change. Accordingly the compensator 50 is positioned near the container so that changes in ambient temperature have little or no effect on the readings given by voltmeter 32.

In the illustrated embodiment the compensator 50 comprises a thermister 52 which has a positive coefficient (i.e. a thermister whose resistance increases with increase in temperature) and this is balanced with a resistor 53 in order to give the desired charaacteristics. This embodiment is particularly advantageous as it provides an indication means which is remote from the container and the readings of which are compensated to accomodate for temperature variations around the container.

We claim:

1. Apparatus for indicating quantity of liquified gas contained in a storage container for supplying gas to a consuming appliance during the supplying of gas to said appliance, the apparatus including a pressure sensing means for sensing gas pressure within the container and being arranged to operate an indicator means which give a desired indication, the indicator means being calibrated to indicate the quantity of liquified gas contained in said container, the indicator means being calibrated to indicate readings up to at least the plateau zone of an earlier determined pressure versus weight curve of the dynamic liquified gas/gas system within the container during use.

2. Apparatus according to claim 1 wherein the indicator means comprises a scale calibrated to indicate the quantity of liquified gas in said container and a pointer arranged to be moved over said scale by the pressure sensing means.

3. Apparatus according to claim 2 wherein the scale is movable relative to the pointer to permit adjustment of scale readings to compensate for ambient temperature variations.

4. Apparatus according to claim 1 wherein the indicator means forms part of an electrical circuit, the pressure sensing means providing a measurable electrical variation in said electrical circuit at the indicator means in dependence on the sensed pressure.

5. Apparatus according to claim 4 wherein the pressure sensing means is a rheostat.

6. Apparatus according to claim 5 wherein the electrical circuit includes compensation means for adjusting the measurable electrical variation at the indicator means in response to variations in ambient temperature.

7. Apparatus according to claim 1 wherein the indicator means is calibrated to indicate readings from zero pressure up to and including pressure corresponding to that within the plateau zone of the earlier determined pressure versus weight curve of the dynamic liquified gas/gas system within the container during use.

8. Apparatus according to claim 7 wherein the indicator means comprises a scale calibrated to indicate the amount of liquified gas in said container and a pointer arranged to be moved over said scale by the pressure sensing means.

9. A method of determining the quantity of a liquified gas in a container comprising the steps for determining the gas pressure within the container during the flow of gas from said container, and using the determined gas pressure during flow of gas from said container to indicate the quantity of liquified gas in the container, the indication done by relating the determined gas pressure with at least the part of an earlier determined pressure versus weight curve of the dynamic liquified gas/gas system within the container during use where the pressure is below that of a pressure where a substantial change in weight does not result in a substantial change in pressure within the container.

10. A method according to claim 9 wherein the gas pressure is determined by a gas pressure sensing means which is arranged to operate an indicator means which is calibrated to indicate quantity of liquified gas.

* * * * *

UNITED STATES PATENT AND TRADEMARK OFFICE
CERTIFICATE OF CORRECTION

PATENT NO. : 4,450,721

DATED : May 29, 1984

INVENTOR(S) : Gaunt, et al.

It is certified that error appears in the above-identified patent and that said Letters Patent are hereby corrected as shown below:

The sheet of Drawing consisting of Figure 1 should be added as per the attached sheet.

Signed and Sealed this

Third Day of June 1986

[SEAL]

Attest:

DONALD J. QUIGG

Attesting Officer

Commissioner of Patents and Trademarks